United States Patent Office 3,505,246
Patented Apr. 7, 1970

3,505,246
NITROGEN ALUMINUM HYDRIDE POLYMERS
AND METHOD OF MAKING THE SAME
Robert Ehrlich and Donald D. Perry, Morristown, N.J., assignors to Thiokol Chemical Corporation, Bristol, Pa., a corporation of Delaware
No Drawing. Filed May 28, 1962, Ser. No. 197,890
Int. Cl. C08f 13/00
U.S. Cl. 260—2      11 Claims This invention relates to a novel group of nitrogen-aluminum polymers and to methods of making the same. The polymers of the present invention are characterized by the fact that they have linear chains of alternating nitrogen and aluminum atoms with the aluminum atoms carrying a hydridic hydrogen and the nitrogen atoms being substituted with a short hydrocarbon chain, usually a lower alkyl group. The recurring units of the polymer may be represented by the general formula:

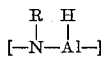

wherein R is a hydrocarbon group of 1 to 3 carbon atoms. As pointed out hereafter, the nature of the end groups on the polymer chain varies as a function of the method by which the polymers are prepared.

The present polymers are useful as components of high energy fuels. Since they contain relatively high percentage of aluminum, they may be advantageously incorporated in high energy solid propellant compositions. The presence of the energetic aluminum-hydrogen linkage enhances the value of the polymers as propellant components. Certain of the polymers are soluble in liquid hydrocarbons and hence may be added directly to liquid hydrocarbon fuels to improve the performance thereof. Moreover, they can be used as intermediates in the preparation of high molecular weight polymers having the physical properties required in a solid propellant binder. More particularly the polymers may be made with the reactive end groups which provide sites for chain-extension reactions to form high molecular weight and/or cross-linked polymers.

It is an object of the present invention to provide a series of polymers largely composed of aluminum and nitrogen that are adapted to be incorporated in high energy fuels to improve the performance thereof. It is another object of the invention to provide polymers of this type having reactive terminals through which still higher molecular weight polymers can be made by chain extension and/or cross linking. It is a still further object of the invention to provide a simple and effective method of making such novel polymers. Other objects of the invention will be in part obvious and in part pointed out hereafter.

The present polymers may be made in a variety of different ways as indicated below. In general, the method of the present invention involves reacting alane ($AlH_3$) or an amine adduct or complex hydride of alane with a reagent such as a nitrile, alkylamine or alkylenimine, usually in a liquid hydrocarbon solvent. The reactions may be carried out at ambient temperature, although moderately elevated temperatures, say 50° C., are usually preferred, since a greater degree of polymerization can be achieved at such elevated temperatures. The products produced by the method described herein are white solids with relatively high decomposition temperatures, i.e., above 170° C. and molecular weights that are usually within the range 500 to 3000. They are considerably more stable in the presence of moisture than the simpler previously known aluminum compounds such as alane, alane adducts and alkyl aluminum compounds. Also they show little or no tendency to form complexes with Lewis bases such as tertiary amines and ethers. As indicated above, they are essentially composed of the recurring units

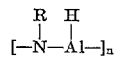

wherein R is a hydrocarbon group of from 1 to 3 carbon atoms and $n$ has a value of about 10 or more. In view of their structure these compounds can be aptly and conveniently called poly(n-alkylalazenes) and will be so referred to herein.

In accordance with one embodiment of the present method, a triethylamine adduct of alane is reacted in benzene solution with acetonitrile according to the following equation:

(1)

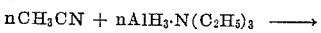

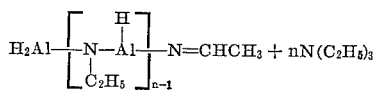

The reaction mixture is heated at about 50° C. for 48 hours to produce a benzene-soluble polymer having a number average molecular weight of about 2500. The molecular weight can be varied to some extent by varying the temperature and length of the reaction period. At temperatures above about 50° C. and for reaction periods longer than about 48 hours, a benzene-insoluble polymer is produced having a somewhat higher molecular weight. The presence of the imino group at one end of the polymer chain was confirmed by infra-red analysis. The relative proportions of the reactants do not appear to be particularly critical. The use of equimolar quantities as indicated by the equation seems to give optimum results.

In accordance with another embodiment of the present method, the triethylamine adduct of alane is reacted with ethylamine as indicated by equation 2 below.

(2)

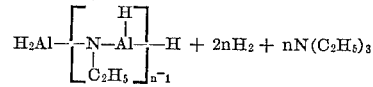

The foregoing reaction when carried out under the same conditions as that of Equation 1 yields a polymer having essentially the same molecular weight and infrared spectrum as that produced by the reaction of Equation 1.

When the reaction of Equation 2 was carried out at 30° C. for a period of three days, a polymer having a molecular weight of about 1150 was obtained which was generally similar to the higher molecular weight polymers except that one molecule of triethylamine was still associated with each molecule of the polymer. Heating of this lower molecular weight polymer in a high vacuum for 16 hours produced a higher molecular weight and probably cross linked polymer free of tertiary amine.

In accordance with still another embodiment of the present method, ethylamine hydrochloride is reacted with lithium aluminum hydride as indicated in Equation 3.

(3)

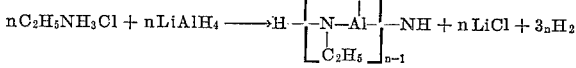

This reaction, when carried out at 50° C. for 48 hours, yielded a benzene-soluble poly(N-ethylalazene) with a molecular weight of about 1500, slightly contaminated with unreacted ethylamine hydrochloride. This material exhibited an infrared spectrum substantially the same as those of the polymers described above.

In accordance with still another embodiment of the present method, triethylamine alane is reacted with ethylenimine as indicated in Equation 4.

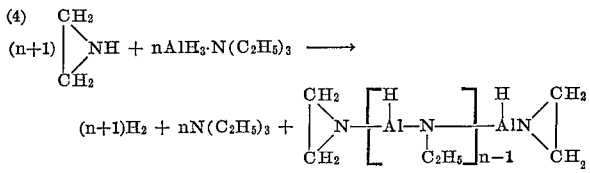

The foregoing reaction proceeded smoothly and rapidly at room temperature to produce a benzene-soluble polymer having a molecular weight of 750 and containing no tertiary amine. The infrared spectrum of the poly(N-ethylalazene) was the same as that of the polymers described above except for an absorption band attributable to the terminal imino grouping.

In accordance with a still further embodiment of the present method, a poly(N-methylalazene) is prepared by reaction of methylamine with the triethylamine adduct of alane according to Equation 5.

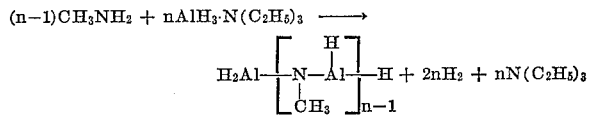

When this reaction is carried out at about 50° C., a product is obtained that is partially soluble and partially insoluble in benzene. However, both fractions exhibit substantially the same infrared spectrum. Analysis of the two fractions indicates that the insoluble material has a degree of polymerization $n$ of about 14, whereas the soluble fraction contains only three repeat units.

In the compounds shown in the foregoing equations the nitrogen substituents in the recurring groups are methyl and ethyl radicals. Corresponding compounds can be prepared wherein the nitrogen substituent is a propyl group or a propenyl group.

In order to point out more fully the nature of the present invention, the following specific examples are given of illustrative methods of making the present polymers.

EXAMPLE I

A solution of 0.1 mol of triethylamine alane in 150 ml. of benzene was added with stirring at room temperature under nitrogen to 4.1 grams (0.1 mol) of anhydrous acetonitrile dissolved in 50 ml. of benzene. The solution turned an iridescent greenish yellow color shortly after the addition started. When the addition was complete, the solution was stirred 48 hours at 50° C. A small quantity of aluminum hydroxide was filtered from the reaction mixture after which the filtrate was freeze-dried. 6.370 grams of a pale yellow solid was isolated. It was soluble in benzene and decomposed above 200° C. without melting.

The solid was purified by redissolving in anhydrous benzene, filtering and then freeze-drying. The material isolated by this procedure was a very pale green in color, almost white, and very fluffy. This product was analyzed to give the results tabulated below. The calculated values are for the polymer formula of Equation 1 above when $n$ equals 33.

*Analysis.*—Calculated (percent): Al, 37.97; N, 19.72; H, 8.51; C, 33.80. Found: (percent): Al, 39.54; N, 18.96; H, 8.19; C, 33.58. Molecular weight.—Calculated: 2416. Found: 2400.

EXAMPLE II

A solution of 9.02 grams (0.20 mol) of anhydrous ethylamine in 50 ml. of anhydrous benzene was prepared and added dropwise with stirring at room temperature to 0.20 mol of triethylamine alane in 304 ml. of benzene. The mixture was stirred 16 hours at 40° C. and 48 hours at 50° C. during which time 0.396 mol of hydrogen (99% of theory) was evolved. The polymer formed comprised a benzene-insoluble fraction and a benzene-soluble fraction. The insoluble fraction comprising 2.551 grams was isolated by filtration and dried 20 hours in vacuo at room temperature. This material sintered at 195° to 205° C. and melted at 218°–222° C. with vigorous decomposition.

The filtrate containing the soluble fraction was lyophilized to yield 11.53 grams of a white polymer sintering at 165–175° C. and melting with decomposition at 190°–194° C. The two fractions were analyzed and found to have essentially the same analysis:

*Analysis.*—Calc'd for $(C_2H_6NAl)_x$ (percent: C, 33.80; H, 8.51; N, 19.72; Al, 37.97. Found (percent): C, 32.97; H, 8.76; N, 19.59; Al, 39.15. The molecular weight of these two fractions was the same and was about 2500.

EXAMPLE III

To a suspension of 4 grams of powdered lithium aluminum hydride in 100 ml. of benzene was added 8.155 grams (0.1 mol) of ethylamine hydrochloride. The mixture was stirred 72 hours at 45°, evolving 0.295 mol of hydrogen (98.3% of the theoretical). The mixture was filtered and the filtrate was lyophilized to give 6.551 grams of a white crystalline polymer having a melting point with decomposition at 172°–175° C. This polymer was found to have a molecular weight of about 1500. The polymer was analyzed with results given below. The calculated values are for the polymer formula of Equation 3 above when $n$ equals 19 and assuming each mol of polymer was associated with one mol of ethylamine hydrochloride.

*Analysis.*—Calculated (percent): N, 19.94; Al, 34.73; Cl, 2.40. Found (percent): N, 19.28; Al, 33.51; Cl, 2.19.

EXAMPLE IV

A solution of 0.0382 mol of triethylamine alane in hexane was prepared and 0.0382 mol of ethylenimine was added dropwise thereto at room temperature. Hydrogen was evolved immediately on the addition of the imine and ceased after the addition stopped. The mol ratio of gas evolved to reagent charged was 1:1.

A small amount of white solid was filtered from the reaction mixture and discarded. The filtrate was then stripped of solvent in vacuo at room temperature to yield 2.27 grams of a white solid which was soluble in hexane and benzene. The solid had a softening range from 81°–270° C. at which point it visibly decomposed. This product was analyzed with the results indicated below, assuming the product had the polymer structure of Equation 4 above with $n$ equal to 9.

*Analysis.*—Calculated (percent): Al, 35.84; N, 20.48; C, 35.11; H, 8.57. Found (percent): Al, 32.44; N, 19.33; C, 35.69; H, 8.54. Molecular weight.—Calculated: 752. Found: 750.

EXAMPLE V

In a closed evacuated system 0.10 mol of methylamine was allowed to react with 0.10 mol of triethylamine alane in 133 ml. of benzene at 50° C. for five days. Periodically during this time unreacted methylamine was recondensed into the reaction mixture. A total of 0.201 mol of hydrogen was evolved (theoretical, 0.200 mol). 5.340 grams of a white benzene-insoluble polymer was isolated and dried in vacuo at room temperature. An additional 0.050 gram was recovered from the filtrate. Both fractions failed to melt below 360° C. and only turned slightly gray during the heating. Analysis of the benzene-insoluble fraction gave the results indicated below, using the polymer formula of Equation 5 above with $n$ equal to 15.

*Analysis.*—Calculated (percent): Al, 48.84; N, 23.68; C, 20.30; H, 7.18. Found (percent): Al, 44.88; N, 23.51; C, 22.65; H, 7.15.

It is of course to be understood that the foregoing examples are intended to be illustrative only and that numerous changes can be made in the ingredients, proportions, and conditions set forth therein without departing from the spirit of the invention as defined in the appended claims.

We claim:
1. A nitrogen-aluminum polymer essentially composed of recurring units of the structure:

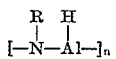

wherein R is a hydrocarbon group of 1 to 3 carbon atoms and $n$ has a value of at least 10.

2. A nitrogen-aluminum polymer essentially composed of recurring units of the structure:

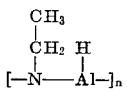

wherein $n$ has the value of at least 10.

3. Poly(N-ethylalazene).
4. Poly(N-methylalazene).
5. The method of making a poly(N-alkylalazene) which comprises reacting triethylamine alane with a reagent selected from the group consisting of acetonitrile, ethylamine, methylamine and ethylenimine to form a poly(N-alkylalazene) having a molecular weight of at least 500.
6. A method according to claim 5 and wherein said reagent is acetonitrile.
7. A method according to claim 5 and wherein said reagent is ethylamine.
8. A method according to claim 5 and wherein said reagent is ethylenimine.
9. A method according to claim 5 and wherein said reagent is methylamine.
10. The method of making a poly(N-alkylalazene) which comprises reacting lithium aluminum hydride and ethylamine hydrochloride to form a poly(N-ethylalazene) having a molecular weight of at least 1000.
11. The method of making a poly(N-alkylalazene) which comprises reacting triethylamine alane and methylamine to form a poly(N-methylalazene) having a molecular weight of at least 500.

References Cited
UNITED STATES PATENTS 3,166,519   1/1965   Woods _____ 260—2

LELAND A. SEBASTIAN, Primary Examiner

U.S. Cl. X.R.

44—62; 149—19, 109